(12) United States Patent  
Bouchez et al.

(10) Patent No.: US 8,593,085 B2  
(45) Date of Patent: Nov. 26, 2013

(54) DEVICE FOR CHARGING ACCUMULATOR MEANS

(75) Inventors: Boris Bouchez, Cergy le Haut (FR); Luis De Sousa, Eragny sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 200 days.

(21) Appl. No.: 13/166,277

(22) Filed: Jun. 22, 2011

(65) Prior Publication Data

US 2012/0049770 A1 Mar. 1, 2012

(30) Foreign Application Priority Data

Jun. 25, 2010 (FR) ...................................... 10 55101

(51) Int. Cl.
*H02P 1/00* (2006.01)
(52) U.S. Cl.
USPC ........... 318/139; 318/440; 320/166; 320/167; 361/110; 361/111; 363/39; 363/40; 363/44; 363/47; 363/75; 327/124; 327/317; 327/551; 327/310; 327/311
(58) Field of Classification Search
USPC .......... 320/107, 127, 128, 137, 163, 121, 109, 320/138, 129, 141, 142, 139, 145, 135, 166, 320/167; 318/139, 599, 440; 363/39, 40, 363/44, 47, 75; 327/124, 317, 551, 310, 327/311, 552; 361/110, 111; 331/41
See application file for complete search history.

(56) References Cited

U.S. PATENT DOCUMENTS

| 4,730,242 | A | 3/1988 | Divan |
| 5,982,253 | A * | 11/1999 | Perrin et al. ................... 333/182 |
| 6,614,204 | B2 * | 9/2003 | Pellegrino et al. ............. 320/109 |
| 7,787,267 | B2 * | 8/2010 | Wu et al. .......................... 363/39 |
| 2007/0170910 | A1 * | 7/2007 | Chang et al. ................. 324/158.1 |
| 2010/0295502 | A1 * | 11/2010 | Mevay ............................ 320/101 |
| 2011/0261591 | A1 * | 10/2011 | Krause ............................ 363/17 |

FOREIGN PATENT DOCUMENTS

| EP | 0 603 778 A1 | 6/1994 |
| WO | 2010/057893 A1 | 5/2010 |

OTHER PUBLICATIONS

French Search Report issued in the corresponding French application No. 1055101, mailing date Apr. 14, 2011 (2 pages).

* cited by examiner

*Primary Examiner* — Rita Leykin
(74) *Attorney, Agent, or Firm* — Osha Liang LLP

(57) ABSTRACT

The present invention relates to an electrical device for charging accumulator means (5), said electrical device comprising:
a motor (6) connected to an external mains (11);
an inverter (2) connected to the phases of said motor (6); and
switching means (4) integrated into the inverter (2), said switching means (4) being configured to permit said motor (6) to be supplied and to permit the accumulator means (5) to be charged by the inverter (2).
According to the invention, said electrical device further includes, for each phase of said motor (6), an RLC low-pass filter (18) connected, on the one hand, to the mid-point (16) of the phase of said motor (6) and, on the other hand, to ground.

8 Claims, 2 Drawing Sheets

DEVICE FOR CHARGING ACCUMULATOR MEANS

The present invention relates to a charging device and falls within the field of motors or alternators supplied by rechargeable batteries. The invention advantageously applies to the field of electric motor vehicles in which the batteries may supply the motor via an inverter and may be recharged when the motor vehicle is at rest.

However, although particularly intended for such an application, the device and the associated method could be used in other fields, especially in energy generation devices of the wind-powered or water-powered type.

Conventionally, an electric vehicle is equipped with high-voltage batteries delivering a DC current to an inverter which converts this DC current into an AC current for supplying an electric motor, the latter being used to move the vehicle.

So as to recharge these high-voltage batteries, it is known to equip the vehicle with a charging device integrated into the electric vehicle, comprising a bridgeless power controller converter also known as a bridgeless PFC (power factor corrector).

Common mode currents, generated by cutting the converter, flow in the parasitic capacitances that the electronics present with respect to the vehicle body or that the engine presents with respect to the vehicle body or else that the battery presents with respect to the vehicle body. These currents are looped back by the vehicle body, the ground wire being connected to the neutral of the mains. Standards limit the emission of high-frequency interference on the mains.

Passive filtering solutions may help to solve the problem. These for example involve placing a common mode filter on the input of the charger. Thus, the common mode currents are looped back by the filter instead of passing onto the mains. However, the drawback of filters, apart from their cost and volume, is that they generate low-frequency (around 50 Hz/60 Hz) leakage currents between the mains and ground.

The objective of the invention is therefore to alleviate these drawbacks of the prior art by providing a charging device for reducing the high-frequency interference on the mains.

For this purpose, one subject of the invention is an electrical device for charging accumulator means, said electrical device comprising:
  a motor connected to an external mains;
  an inverter connected to the phases of said motor; and
  switching means integrated into the inverter, said switching means being configured to permit said motor to be supplied and to permit the accumulator means to be charged by the inverter,
characterized in that said electrical device further includes, for each phase of said motor, an RLC low-pass filter connected to the mid-point of the phase of said motor, to ground and to a phase of the external mains.

Each RLC low-pass filter may comprise three terminals, connected to the mid-point of the phase of said motor, to ground and to one phase of the external mains respectively.

Such a passive filter makes it possible to attenuate the high-frequency interference without generating leakage currents between the mains and ground.

Said charging device may further include one or more of the following features, taken individually or in combination:
  the RLC low-pass filter comprises:
    an inductor connected to the mid-point of said phase of said motor via a first end, and the second end of which is connected to a second coil moiety of said motor;
    a capacitor, a first end of which is connected to the second end of the inductor; and
    a resistor, a first end of which is connected to the second end of the capacitor and a second end of which is connected to ground;
  the switching means comprise an H-bridge structure for each phase of the motor, such that each H-bridge structure has two switching arms respectively comprising two switches, the associated phase of said motor being connected between the four switches of the two switching arms;
  the switching means respectively comprise at least one transistor and at least one diode in parallel;
  said device includes a DC/DC converter between the switching means and the accumulator means;
  said motor is a three-phase motor;
  it includes a control circuit configured so as to control the switching means so as to pass from a mode for supplying said motor to a mode for charging the accumulator means, and vice versa;
  the control circuit is configured so as to transmit a PWM (pulse width modulation) control signal.

Other features and advantages of the invention will become apparent from the following description, given by way of example but implying no limitation, in conjunction with the appended drawings in which.

In these figures and in the rest of the description, identical elements are identified by the same reference numbers.

Figure 1:
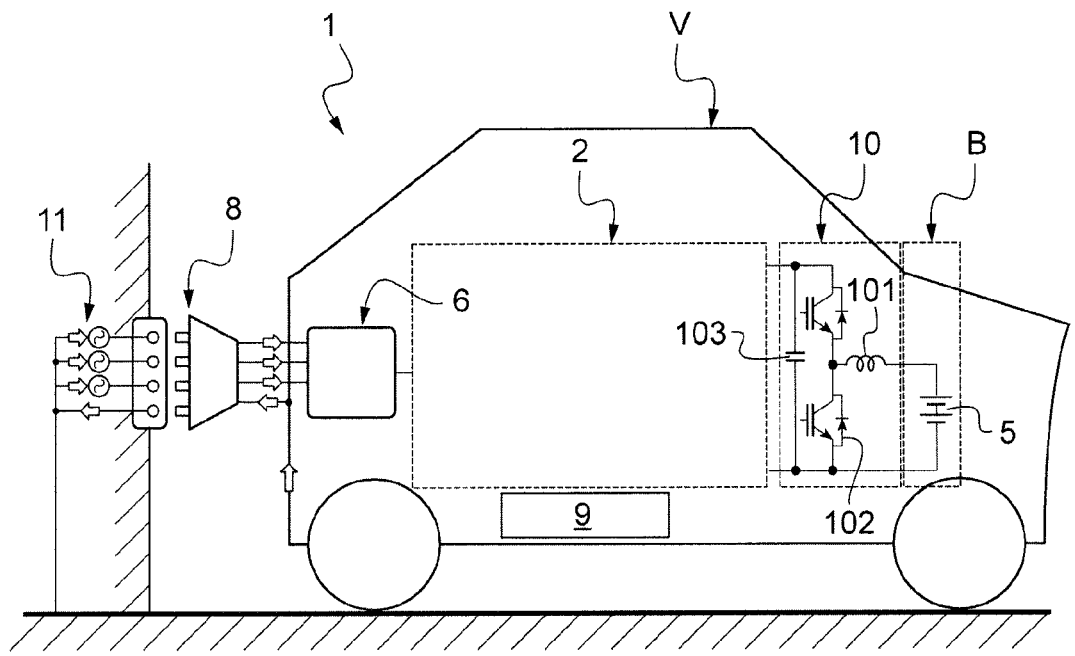
FIG. 1 shows schematically a three-phase charging device with a three-phase mains for a motor vehicle.
Figure 2:
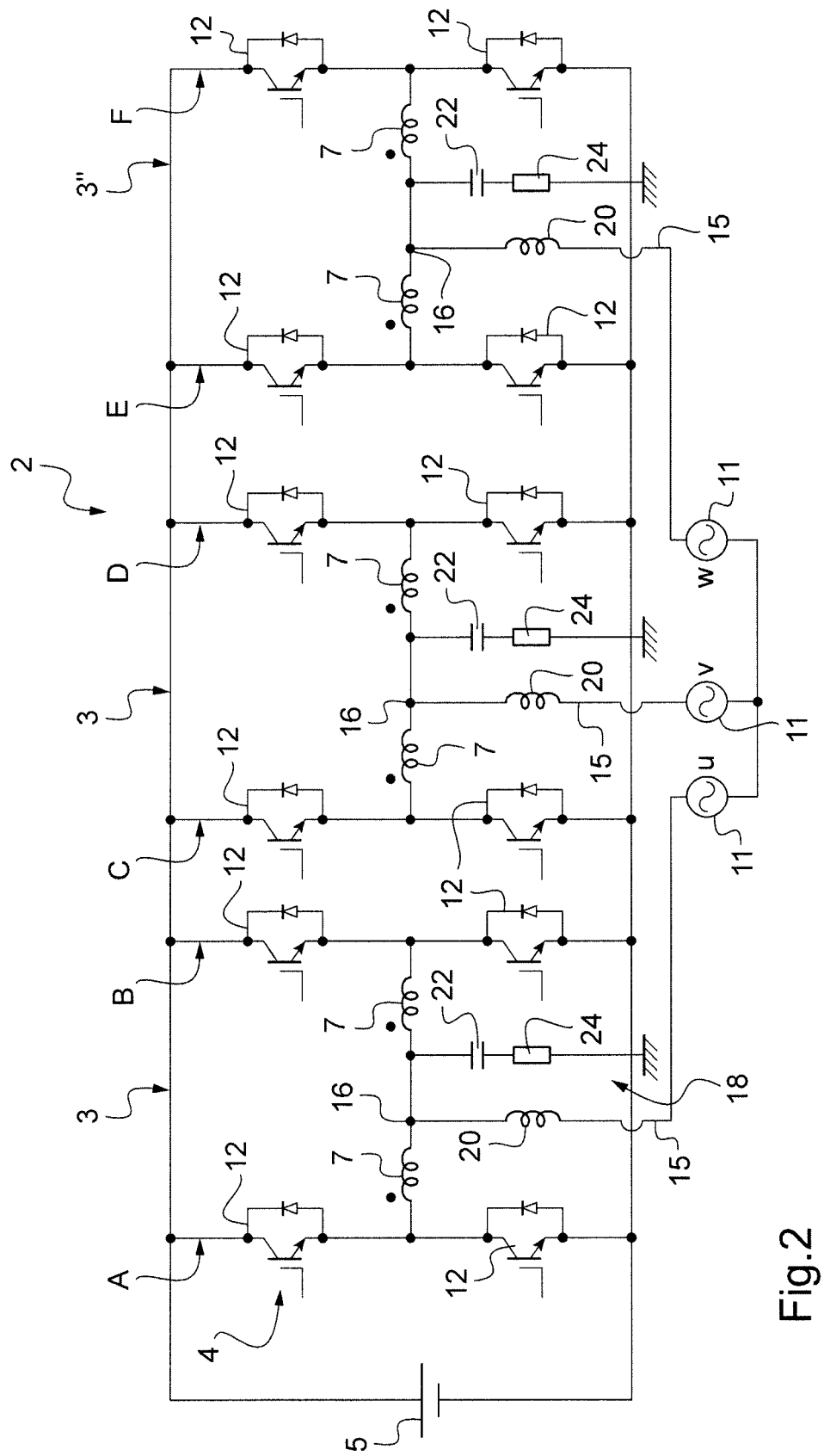
FIG. 2 is a more detailed view of part of the charging device of FIG. 1.

Referring to FIGS. 1 and 2, these show schematically a device 1 for charging a battery B of a motor vehicle V, for example a hybrid or electric vehicle.

This charging device 1 comprises:
  an inverter 2 and switching means 4 integrated into the inverter 2 and comprises three H-bridges 3, 3', 3";
  an AC three-phase motor 6 having a mid-point, said motor being shown in part, the coils 7 of which act as an inductor;
  a connector 8; and
  a control circuit 9.

The device 1 may also include a DC/DC converter 10 placed between the inverter 2 and the accumulating means 5 of the battery B.

Each H-bridge 3, 3', 3" comprises four switches 12 distributed over the six arms referenced A to F. One advantage of an H-bridge over a conventional three-phase bridge is that its use doubles the voltage applied to the phases of the motor 6 for a given voltage; thus, although the device has twice the number of switches 12, the silicon area used will be the same for the H-bridge as that of the conventional three-phase bridge since in fact the phase currents are decreased by a factor of two.

The use of H-bridges also makes it possible to reduce the switching-induced losses.

Each switching arm A to F comprises two switches 12—a first switch 12 at the top of the switching arm in FIG. 2 and a second switch 12 at the bottom of the switching arm.

The connector 8 is used to connect the motor 6 to the socket of a three-phase mains 11. For example, for each phase of the motor 6, the terminals 15 of the mains 11 are connected via the inductor 20 to the mid-points 16 of the two coils 7 of the phase of the motor 6.

Moreover, the connector 8 may include locking means (not shown in the appended figures) for preventing access to the mains socket should the device 1 be under voltage. The connector 8 may also be combined with second locking means (not shown) preventing access by the user to the conductors (which are then under voltage) during the supply mode.

The control circuit 9 itself serves to control the switches 12. In the figures, the link between the control circuit 9 and the switches 12 has not been shown in order to make the figures easier to understand.

In the example illustrated, the charging device 1 is designed to operate in two modes:
- a supply mode in which it supplies the motor 6 with AC current via the battery B; and
- a charging mode in which it charges the battery B from the mains 11 connected to ground, employing the windings 7 of the motor 6 as inductor.

The switch from supply mode to charging mode may be controlled by the control circuit 9.

As an example, in supply mode, the control circuit 9 controls all the arms A, B, C, D, E and F, generating three-phase currents in a similar manner to a standard control unit. In charging mode, only the arms B, D and F are controlled, producing, with the inductors 7 of the motor 6 of the electrical machine, a rise in voltage.

More precisely, and in the present example, the control circuit 9 controls the arms A to F in the following manner:
- in supply mode, each of the H-bridges is controlled so as to allow an AC current of flow in the corresponding phase of the motor. The AC currents in the three phases of the motor are conventionally coordinated so that the motor rotates. The switches 12 (which in the present example are power transistors) of the branches A and B may be controlled by a conventional sinusoidal PWM control device. The two other H-bridges are controlled in a similar manner, but with a phase shift between them, preferably a 120° phase shift in the case of a three-phase motor; and
- in three-phase charging mode, the two switches of each of the arms A, C and E are open whereas the switches of the arms B, D and F are controlled using a conventional alternative control device for a three-phase charger so that an AC current flows through each inductor 7 and the PFC (power factor correction) function is performed on all the phases.

Moreover, referring again to FIG. 1, the use of a DC/DC converter 10 placed between the inverter 2 and the accumulator means 5 make it possible to adapt the voltages and consequently to optimize the size of the inverter without degrading the efficiency. In fact, the voltage of the accumulator means 5 varies with their charge, the variations ranging from single to double variations; the use of a DC/DC converter 10 makes it possible to size the inverter 2 for a lower voltage, said inverter having to pass half as much current.

To give an example, this converter 10 comprises an inductor 101 connected to the accumulator means 5, two switches 102, the mid-point of which is connected to the inductor 101, and a capacitor 103 connected to the terminals of the two switches 102.

Figure 3:
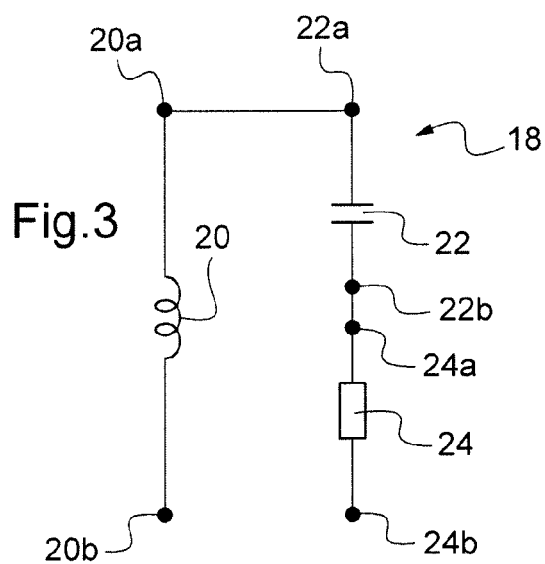
FIG. 3 illustrates a low-pass filter of the charging device of FIG. 1.

Furthermore, as may be noted in FIG. 2, the charging device 1 also includes, for each phase of the motor 6, an RLC low-pass filter 18 (better visible in FIG. 3) connected, on the one hand, to the mid-point 16 and, on the other hand, to ground.

More precisely, an RLC filter 18 comprises:
- an inductor 20 connected to the mid-point 16 via its first end 20a, its second end 20b being connected to one phase of the mains;
- a capacitor 22, a first end 22a of which is connected to the first end 20a of the inductor 20; and
- a resistor 24, a first end 24a of which is connected to the second end 22b of the capacitor 22 and a second end 24b of which is connected to ground.

This RLC filter is therefore effective for reducing high-frequency interference while enabling a small size of components to be used.

Of course, the three-phase charging device 1 described above can be generalized to a polyphase system.

The invention claimed is:

1. An electrical device for charging accumulator means, said electrical device comprising:
   a motor connected to an external mains;
   an inverter connected to phases of said motor;
   switching means integrated into the inverter, said switching means being configured to permit said motor to be supplied and to permit the accumulator means to be charged by the inverter; and
   for each phase of said motor, an RLC low-pass filter comprising three terminals respectively connected to the mid-point of a phase of said motor, to ground, and to a phase of the external mains.

2. The electrical device according to claim 1, wherein the RLC low-pass filter comprises:
   an inductor connected to the mid-point of said phase of said motor via a first end, and connected to a second coil moiety of said motor via a second end;
   a capacitor, a first end of which is connected to the second end of the inductor; and
   a resistor, a first end of which is connected to a second end of the capacitor and a second end of which is connected to ground.

3. The electrical device according to claim 1, wherein the switching means comprise an H-bridge structure for each phase of the motor, such that each H-bridge structure has two switching arms respectively comprising two switches, an associated phase of said motor being connected between the four switches of the two switching arms.

4. The electrical device according to claim 1, wherein the switching means respectively comprise at least one transistor and at least one diode in parallel.

5. The electrical device according to claim 1, further comprising a DC/DC converter between the switching means and the accumulator means.

6. The electrical device according to claim 1, wherein said motor is a three-phase motor.

7. The electrical device according to claim 1, further comprising a control circuit configured to control the switching means to pass from a mode for supplying said motor to a mode for charging the accumulator means, and vice versa.

8. The electrical device according to claim 7, wherein the control circuit is configured to transmit a PWM (pulse width modulation) control signal.

* * * * *